United States Patent
Hasegawa et al.

(10) Patent No.: US 10,418,187 B2
(45) Date of Patent: Sep. 17, 2019

(54) CARBON POROUS BODY, METHOD FOR PRODUCING THE SAME, ELECTRODE FOR STORAGE DEVICE, AND STORAGE DEVICE

(71) Applicant: KABUSHIKI KAISHA TOYOTA CHUO KENKYUSHO, Nagakute-shi, Aichi-ken (JP)

(72) Inventors: Masaki Hasegawa, Nagakute (JP); Nobuhiro Ogihara, Nagakute (JP); Norihiko Setoyama, Nagakute (JP)

(73) Assignee: KABUSHIKI KAISHA TOYOTA CHUO KENKYUSHO, Aichi-ken (JP)

( * ) Notice: Subject to any disclaimer, the term of this patent is extended or adjusted under 35 U.S.C. 154(b) by 0 days.

(21) Appl. No.: 15/436,266

(22) Filed: Feb. 17, 2017

(65) Prior Publication Data
US 2017/0256365 A1    Sep. 7, 2017

(30) Foreign Application Priority Data

Mar. 1, 2016    (JP) .................. 2016-038986
Feb. 15, 2017   (JP) .................. 2017-025595

(51) Int. Cl.
| | |
|---|---|
| H01G 11/06 | (2013.01) |
| H01G 11/26 | (2013.01) |
| H01G 11/34 | (2013.01) |
| H01G 11/86 | (2013.01) |
| B01J 20/20 | (2006.01) |
| H01G 11/24 | (2013.01) |
| C01B 32/312 | (2017.01) |
| H01G 11/50 | (2013.01) |

(52) U.S. Cl.
CPC .......... *H01G 11/26* (2013.01); *C01B 32/312* (2017.08); *H01G 11/24* (2013.01); *H01G 11/34* (2013.01);
(Continued)

(58) Field of Classification Search
CPC ......... C01B 31/10; C01B 31/04; H01G 11/46; H01G 11/26; H01G 11/06; H01G 11/34; H01G 11/86; B01J 20/20
(Continued)

(56) References Cited

U.S. PATENT DOCUMENTS

| | | |
|---|---|---|
| 4,873,218 A | 10/1989 | Pekala |
| 6,342,319 B1 | 1/2002 | Kuboki et al. |

(Continued)

FOREIGN PATENT DOCUMENTS

| | | |
|---|---|---|
| JP | H10-312808 A | 11/1998 |
| JP | 2004-345921 A | 12/2004 |

(Continued)

OTHER PUBLICATIONS

Zhao et al, "Ultramicroporous Carbon Nanoparticles for the High-Performance Electrical Double-Layer Capacitor Electrode," Energy & Fuels, pp. 1561-1568, 2014.
(Continued)

*Primary Examiner* — Eric W Thomas
*Assistant Examiner* — Arun Ramaswamy
(74) *Attorney, Agent, or Firm* — Oliff PLC

(57) ABSTRACT

The carbon porous body of the present disclosure includes micropores and mesopores. A micropore volume determined at a temperature of 77K by as plot analysis of a nitrogen adsorption isotherm is 100 (cm$^3$ (STP)/g) or more. A BET specific surface area determined from the nitrogen adsorption isotherm is 1,000 m$^2$/g or more. The derivative of the nitrogen adsorption isotherm is 300 (cm$^3$ (STP)/g) or more over the range where relative pressure P/P$_0$ in the nitrogen adsorption isotherm is from 0.10 to 0.20 inclusive, and the derivative of the nitrogen adsorption isotherm is 200 (cm$^3$ (STP)/g) or more over the range where the relative pressure P/P$_0$ in the nitrogen adsorption isotherm is from 0.20 to 0.95 inclusive. The amount of nitrogen adsorbed when the relative pressure P/P$_0$ in the nitrogen adsorption isotherm is 0.98 is 1,200 (cm$^3$ (STP)/g) or more.

8 Claims, 13 Drawing Sheets

(52) U.S. Cl.
 CPC ...... *C01P 2006/12* (2013.01); *C01P 2006/14* (2013.01); *H01G 11/50* (2013.01); *Y02E 60/13* (2013.01); *Y02T 10/7022* (2013.01)

(58) Field of Classification Search
 USPC .............................. 361/502, 508, 516, 503
 See application file for complete search history.

(56) References Cited

U.S. PATENT DOCUMENTS

| | | |
|---|---|---|
| 2012/0174936 A1 | 7/2012 | Branton et al. |
| 2015/0232340 A1* | 8/2015 | Bao .................. C01B 31/04 264/29.1 |

FOREIGN PATENT DOCUMENTS

| | | |
|---|---|---|
| JP | 2011-051828 A | 3/2011 |
| JP | 2012-520230 A | 9/2012 |

OTHER PUBLICATIONS

Feb. 27, 2018 Office Action issued in Japanese Patent Application No. 2016-038986.
Mar. 19, 2019 Office Action issued in Japanese Patent Application No. 2017-025595.

* cited by examiner

CARBON POROUS BODY, METHOD FOR PRODUCING THE SAME, ELECTRODE FOR STORAGE DEVICE, AND STORAGE DEVICE

BACKGROUND OF THE INVENTION

1. Field of the Invention

The present disclosure, which is the invention disclosed in the present specification, relates to a carbon porous body, to a method for producing the same, to an electrode for a storage device, and to a storage device.

2. Description of the Related Art

In one previously known carbon porous body, its carbon skeleton is partially substituted with nitrogen atoms (PTL 1). This carbon porous body has a microporous structure having an average pore diameter of 2 nm or less. A low-density carbon foam having a cell size of about 0.1 m is also known (PTL 2). This carbon foam is synthesized by subjecting polymer clusters obtained by polycondensation of resorcinol with formaldehyde to covalent crosslinking to thereby synthesize a gel, processing the gel under supercritical conditions to obtain an aerogel, and then carbonizing the aerogel.

In one proposed storage device, a carbon material for capacitors synthesized using aromatic organic materials as raw materials is used for electrodes (see, for example, NPL 1). The carbon porous body used in this storage device is prepared by subjecting two types of raw materials to polymerization to thereby synthesize a polymer in which bonds in the aromatic rings are two-dimensionally arranged and then firing and carbonizing the polymer in an inert atmosphere. In this carbon porous body, almost all the pores in the particles are micropores. However, it is stated the following. The particle diameter can be changed by changing the conditions of the synthesis. When the particles are reduced in diameter, spaces between the particles serve as mesopores, and this contributes to electrode performance.

[PTL 1] Japanese Unexamined Patent Application Publication No. 2011-051828
[PTL 2] U.S. Pat. No. 4,873,218
[NPL 1] Energy & Fuels 2014, 28, 1561-1568

SUMMARY OF THE INVENTION

At present, no carbon porous body is known which has a mesoporous structure and in which the difference in the amount of nitrogen adsorbed with respect to the difference in relative nitrogen pressure is large in the range where the relative nitrogen pressure is relatively large. As a matter of course, no method for easily producing such a carbon porous body is known. It is expected to use the above carbon porous body as a material capable of desorbing a specific gas.

Carbon porous bodies adsorb and desorb ions and are used as active materials of storage devices. In NPL 1, the BET specific surface area of the carbon porous body is less than 1,000 m²/g, which is small for electrode materials of capacitors. In this carbon porous body, the particles are reduced in diameter to increase the number of mesopores between the particles. Since the mesopores are not internal pores, their form is not sufficient.

The present disclosure has been made to solve the above problems, and it is a principal object to provide a novel carbon porous body. Another principal object of the present disclosure is to provide a novel electrode for a storage device that can improve charge-discharge capacity in a wider temperature range and to provide a storage device.

The present inventors have conducted extensive studies to achieve the above objects and found that a novel carbon porous body can be obtained by firing a lithium salt of an aromatic carboxylic acid, and thus the invention disclosed in the present specification has been completed.

Specifically, the carbon porous body disclosed in the present specification includes
micropores and mesopores, wherein a micropore volume determined by αs plot analysis of a nitrogen adsorption isotherm at a temperature of 77K is 100 (cm³ (STP)/g) or more,
a BET specific surface area determined from the nitrogen adsorption isotherm is 1,000 m²/g or more,
a derivative of the nitrogen adsorption isotherm is 300 (cm³ (STP)/g) or more over a range where relative pressure $P/P_0$ in the nitrogen adsorption isotherm is from 0.10 to 0.20 inclusive, and the derivative of the nitrogen adsorption isotherm is 200 (cm³ (STP)/g) or more over a range where the relative pressure $P/P_0$ in the nitrogen adsorption isotherm is from 0.20 to 0.95 inclusive, and
the amount of nitrogen adsorbed at a relative pressure $P/P_0$ in the nitrogen adsorption isotherm of 0.98 is 1,200 (cm³ (STP)/g) or more.

A method for producing a carbon porous body disclosed in the present specification includes a firing step of heating an aromatic carboxylic acid lithium salt in an inert atmosphere in a range of from 850° C. to 1,000° C. inclusive to thereby carbonize the aromatic carboxylic acid lithium salt.

The electrode for a storage device disclosed in the present specification includes the above-described carbon porous body as an active material. The storage device disclosed in the present specification includes the above-described electrode for a storage device.

According to the present disclosure, a novel carbon porous body including micropores and mesopores can be provided. It is conceivable that this carbon porous body has a structure including the micropores and the mesopores that is not obtained, for example, through ordinary activation treatment. This may be because, for example, the crystal structure of the aromatic carboxylic acid lithium salt used as the raw material and the action of lithium allow the characteristic pore structure to be formed. In the carbon porous body, lithium is removed from the carbon porous body by, for example, firing in the production step, and the novel carbon porous body including the micropores and the mesopores can be obtained by one-step processing. The carbon porous body has the micropores and the mesopores, and functionality improvements such as an improvement in gas adsorption rate are expected.

According to the present disclosure, a novel storage device electrode that can improve charge-discharge capacity over a wider temperature range and a novel storage device can be provided. The reason that the above effect is obtained may be as follows. For example, the carbon porous body used as the active material has the pore structure including both the micropores and the mesopores, and this pore structure is not obtained through ordinary activation treatment. The reason that the above effect is obtained may be that the surface area usable for adsorption-desorption of charge-carrying ions is increased. In particular, it is conceivable that the presence of large pores is effective in preventing a reduction in capacity at low temperature or under high load. Moreover, a significant improvement in low-temperature performance can be achieved for adsorption and desorption of large solvated lithium ions.

DETAILED DESCRIPTION OF THE INVENTION

Figure 1:
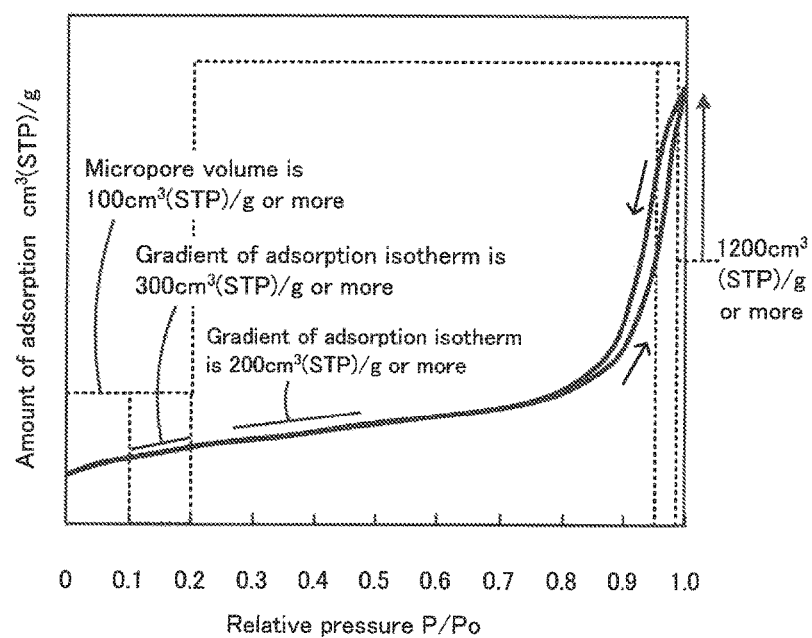
FIG. 1 is an illustration showing an example of the nitrogen adsorption isotherm of the carbon porous body of the present disclosure.

The carbon porous body of the present disclosure will next be described with reference to the drawings. The carbon porous body has characteristics shown in FIG. 1. FIG. 1 is an illustration showing an example of the nitrogen adsorption isotherm of the carbon porous body. The carbon porous body includes micropores and mesopores, and the micropore volume determined by αs plot analysis of the nitrogen adsorption isotherm at a temperature of 77K is 100 ($cm^3$ (STP)/g) or more. In this carbon porous body, the micropore volume is preferably 120 ($cm^3$ (STP)/g) or more and more preferably 150 ($cm^3$ (STP)/g) or more. In this carbon porous body, the micropore volume may be 400 ($cm^3$ (STP)/g) or less. For example, by adjusting the conditions of firing, the micropore volume can be controlled, and the intended adsorption characteristics can be obtained. The mesopores are pores with a diameter of more than 2 nm and 50 nm or less, and the micropores are pores with a diameter of 2 nm or less. In the αs plot analysis, a standard isotherm for comparison is used. The standard isotherm used is described in "Characterization of porous carbons with high resolution alpha(s)-analysis and low temperature magnetic susceptibility" Kaneko, K; Ishii, C; Kanoh, H; Hanazawa, Y; Setoyama, N; Suzuki, T, ADVANCES IN COLLOID AND INTERFACE SCIENCE vol. 76, p 295-320 (1998).

In the carbon porous body, its BET specific surface area determined from the nitrogen adsorption isotherm is 1,000 $m^2$/g or more. In the carbon porous body, the BET specific surface area determined from the nitrogen adsorption isotherm is preferably 1,200 $m^2$/g or more and more preferably 1,500 $m^2$/g or more. A large BET specific surface area is preferred for an adsorbent. The BET specific surface area may be 3,000 $m^2$/g or less. The BET specific surface area may be appropriately adjusted according to the intended adsorption characteristics.

As shown in FIG. 1, in the carbon porous body, the derivative of the nitrogen adsorption isotherm is 300 ($cm^3$ (STP)/g) or more over the range where the relative pressure $P/P_0$ in the nitrogen adsorption isotherm is from 0.10 to 0.20 inclusive. The derivative of the nitrogen adsorption isotherm is obtained by dividing the difference in the amount of nitrogen adsorbed between a specific measurement point (relative pressure $P/P_0$, the amount of nitrogen adsorbed) in the adsorption isotherm and the next measurement point by the difference in relative pressure and is a value representing the gradient of the nitrogen adsorption isotherm. In the carbon porous body, the derivative of the nitrogen adsorption isotherm in the range where the relative pressure $P/P_0$ is from 0.10 to 0.20 inclusive is preferably 400 ($cm^3$ (STP)/g) or more and more preferably 500 ($cm^3$ (STP)/g) or more. The derivative of the nitrogen adsorption isotherm may be 3,000 ($cm^3$ (STP)/g) or less.

In the carbon porous body, the derivative of the nitrogen adsorption isotherm is 200 ($cm^3$ (STP)/g) or more over the range where the relative pressure $P/P_0$ in the nitrogen adsorption isotherm is from 0.20 to 0.95 inclusive. In the carbon porous body, the derivative of the nitrogen adsorption isotherm in the range where the relative pressure $P/P_0$ is from 0.20 to 0.95 inclusive is preferably 300 ($cm^3$ (STP)/g) or more and more preferably 400 ($cm^3$ (STP)/g) or more. The derivative of the nitrogen adsorption isotherm may be 3,000 ($cm^3$ (STP)/g) or less.

In the carbon porous body, the amount of nitrogen adsorbed at a relative pressure $P/P_0$ in the nitrogen adsorption isotherm of 0.98 is 1,200 ($cm^3$ (STP)/g) or more. In the carbon porous body, the amount of nitrogen adsorbed at a relative pressure $P/P_0$ in the nitrogen adsorption isotherm of 0.98 is preferably 1,400 ($cm^3$ (STP)/g) or more and more preferably 1,500 ($cm^3$ (STP)/g) or more. The amount of nitrogen adsorbed may be 3,000 ($cm^3$ (STP)/g) or less.

A method for producing the carbon porous body of the present disclosure will next be described. This production method includes, for example, a firing step of heating an aromatic carboxylic acid lithium salt in an inert atmosphere in the range of from 800° C. to 1,000° C. inclusive to thereby carbonize the aromatic carboxylic acid lithium salt. With this production method, the carbon porous body having the above-described characteristics can be produced. Examples of the aromatic carboxylic acid in the firing step include: a compound in which a carboxy group is bonded to a polycyclic aromatic hydrocarbon having a structure including a plurality of condensed benzene rings (e.g., naphthalene); and a compound in which a carboxy group is bonded to an aromatic hydrocarbon having a structure including a plurality of benzene rings bonded together (e.g., biphenyl). Specifically, the aromatic carboxylic acid lithium salt used may be at least one of a naphthalenedicarboxylic acid dilithium salt and a biphenyldicarboxylic acid dilithium salt. Examples of the inert atmosphere include a nitrogen atmosphere and a noble gas atmosphere, and a nitrogen atmosphere is preferred. In terms of energy consumption, the firing temperature is as low as possible and is, for example, preferably 950° C. or lower and more preferably 850° C. or lower. In terms of removal of the metal component (e.g., lithium), the firing temperature is preferably as high as possible and is, for example, preferably 850° C. or higher and more preferably 950° C. or higher. The retention time for firing may be, for example, 50 hours or shorter. The retention time is preferably 0.5 to 20 hours and more preferably 1 to 10 hours. When the retention time is 0.5 hours or longer, the structure of the carbon porous body is formed sufficiently. The retention time is preferably 20 hours or shorter because the energy consumption can be further reduced.

The method for producing the carbon porous body of the present disclosure may further include, after the firing step, an elution treatment step of washing the carbon porous body with a washing solution capable of dissolving the metal component. In this production method, the metal component is burnt and removed in the firing step, but the remaining metal component can be further removed by the elution treatment. Examples of the washing solution capable of dissolving the metal component include water and acidic aqueous solutions, and acidic aqueous solutions are preferable. Examples of the acidic aqueous solutions include aqueous solutions of hydrochloric acid, nitric acid, and acetic acid. It is inferred that, as a result of the washing, cavities are formed in portions previously occupied by the metal component.

The carbon porous body obtained can be used as an adsorbent. A material to be adsorbed may be selected according to, for example, the characteristics of the carbon porous body. The carbon porous body can be used as an active material of a storage device.

With the carbon porous body of the present embodiment and the method for producing the same described above in detail, a novel carbon porous body including micropores and mesopores can be provided. It is conceivable that the carbon porous body has a structure including the micropores and the mesopores that is not obtained through, for example, ordinary activation treatment. The carbon porous body includes the micropores and the mesopores, and functionality improvements such as an improvement in gas adsorption rate and an improvement in the amount of gas adsorbed are expected.

The storage device of the present disclosure will next be described. This storage device includes a storage device electrode including the above-described carbon porous body as an active material. The storage device electrode including the carbon porous body as the active material may be a positive electrode or a negative electrode, which depends on the potential of the counter electrode. The storage device electrode may be used for both the positive and negative electrodes. The counter electrode of the storage device electrode may contain an active material that can occlude and release ions or may contain an active material that can adsorb and desorb ions. The above carbon porous body can adsorb and desorb ions. The above storage device may be, for example, an electric double layer capacitor, a hybrid capacitor, a pseudo electric double layer capacitor, etc. For the sake of convenience of description, a hybrid capacitor (lithium ion capacitor) will be mainly described. This hybrid capacitor is prepared by combining the storage device electrode including the carbon porous body as the active material with a lithium secondary battery negative electrode that can occlude and release lithium.

The storage device electrode is composed as a capacitor electrode that uses, as an active material, the carbon porous body capable of adsorbing and desorbing ions and exhibits electric double layer capacitance. This electrode may be formed, for example, by mixing the carbon porous body used as the active material, an electrical conducting material, and a binder as needed, adding an appropriate solvent to the mixture to prepare an electrode mixture in paste form, applying the electrode mixture to the surface of a current collector, drying the electrode mixture, and, if necessary, compressing the dried electrode mixture in order to increase the density of the electrode. The electrical conducting material used may be, for example, one of or a mixture of at least two of graphite such as natural graphite (flake graphite and scale-like graphite) and synthetic graphite, acetylene black, carbon black, Ketjen black, carbon whiskers, needle coke, carbon fibers, and metals (copper, nickel, aluminum, silver, gold, and noble metals). Of these, carbon black and acetylene black are preferable as the electrical conducting material in terms of electron conductivity and the ease of application. The binder plays a role in anchoring particles of the active material and particles of the electrical conducting material. The binder used may be one of or a mixture of at least two of: fluorine-containing resins such as polytetrafluoroethylene (PTFE), polyvinylidene fluoride (PVdF), and fluorocarbon rubber; thermoplastic resins such as polypropylene and polyethylene; ethylene-propylene-diene monomer (EPDM) rubber; sulfonated EPDM rubber; natural butyl rubber; etc. A cellulose-based binder (e.g., carboxymethyl cellulose (CMC)), which is an aqueous binder, a water dispersion of styrene-butadiene rubber (SBR), etc. may also be used. Examples of the coating method include roller coating using, for example, an applicator roll, screen coating, a doctor blade method, spin coating, and a bar coater. Any of these methods may be used to obtain an electrode having a given thickness and a given shape. The current collector used may be aluminum, copper, titanium, stainless steel, nickel, iron, baked carbon, a conductive polymer, conductive glass, etc. Examples of the shape of the current collector include a foil shape, a film shape, a sheet shape, a net shape, a punched or expanded shape, a lath body, a porous body, a foamed body, and a shape formed of a group of fibers. The current collector used has a thickness of, for example, 1 to 500 μm.

The storage device of the present disclosure may include a positive electrode, a negative electrode, and an ion conducting medium. The positive electrode may be the storage device electrode including the above-described carbon porous body as the active material. The negative electrode may contain a negative electrode active material and may include a current collector. The ion conducting medium is interposed between the positive electrode and the negative electrode and conducts ions (cations and anions). The negative electrode may be formed, for example, by bringing a negative electrode active material into contact with a current collector or by mixing the negative electrode active material, an electrical conducting material, and a binder as needed, adding an appropriate solvent to the mixture to prepare a negative electrode mixture in paste form, applying the negative electrode mixture to the surface of the current collector, drying the negative electrode mixture, and, if necessary, compressing the dried negative electrode mixture in order to increase the density of the electrode. Examples of the negative electrode active material include metal lithium, lithium alloys, inorganic compounds such as tin compounds, carbonaceous materials capable occluding and releasing lithium ions, complex oxides containing a plurality of elements, and conductive polymers. Examples of the carbonaceous materials include coke, glassy carbon, graphite, non-graphitizable carbon, pyrolytic carbon, and carbon fibers. Of these, graphite such as synthetic graphite or natural graphite is preferable because it has an operating potential close to that of metal lithium, allows charging and discharging at a high operating voltage, can prevent self-discharge when a lithium salt is used as a supporting electrolyte, and can reduce irreversible capacity during charging. Examples of the complex oxide include lithium-titanium complex oxide and lithium vanadium complex oxide. The negative electrode active material is preferably a carbonaceous material, in terms of safety. The electrical conducting material, the binder, the solvent, etc. that are used for the negative electrode may be any of those exemplified for the positive electrode. Copper, nickel, stainless steel, titanium, aluminum, baked carbon, a conductive polymer, conductive glass, an Al—Cd alloy, etc. can be used for the current collector of the negative electrode. In addition, for the purpose of improving adhesion, electric conductivity, and reduction resistance, a current collector that is, for example, formed of copper and having a surface treated with carbon, nickel, titanium, silver, etc. may also be used. The surface of the current collector may be subjected to oxidation treatment. The shape of the current collector may be the same as the shape of the positive electrode.

In the storage device, the ion conducting medium may be, for example, a non-aqueous electrolyte or a non-aqueous gel electrolyte each containing a supporting electrolyte and an organic solvent. Examples of the solvent of the non-aqueous electrolyte include carbonates, esters, ethers, nitriles, furans, sulfolanes, and dioxolanes, and these may be used alone or as a mixture. Specific examples of the solvent include: cyclic carbonates such as ethylene carbonate, propylene carbonate, vinylene carbonate, butylene carbonate, and chloroethylene carbonate; chain carbonates such as dimethyl carbonate, ethyl methyl carbonate, diethyl carbonate, ethyl-n-butyl carbonate, methyl-t-butyl carbonate, di-i-propyl carbonate, and t-butyl-i-propyl carbonate; cyclic esters such as γ-butyrolactone and γ-valerolactone; chain esters such as methyl formate, methyl acetate, ethyl acetate, and methyl butyrate; ethers such as dimethoxyethane, ethoxymethoxyethane, and diethoxyethane; nitriles such as acetonitrile and benzonitrile; furans such as tetrahydrofuran and methyltetrahydrofuran; sulfolanes such as sulfolane and tetramethylsulfolane; and dioxolanes such as 1,3-dioxolane and methyldioxolane. Of these, a combination of a cyclic carbonate and a chain carbonate is preferable.

Examples of the supporting electrolyte contained in the ion conducting medium include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$. In terms of electric characteristics, it is preferable to use one or a combination of at least two salts selected from the group consisting of inorganic salts such as $LiPF_6$, $LiBF_4$, $LiAsF_6$, and $LiClO_4$ and organic salts such as $LiCF_3SO_3$, $LiN(CF_3SO_2)_2$, and $LiC(CF_3SO_2)_3$. The concentration of the supporting electrolyte in the non-aqueous electrolyte is preferably from 0.1 mol/L to 5 mol/L inclusive and more preferably from 0.5 mol/L to 2 mol/L inclusive. When the concentration of the dissolved supporting electrolyte is 0.1 mol/L or more, a sufficient current density can be obtained. When the concentration is 5 mol/L or less, the electrolyte can be further stabilized. A phosphorus-based flame retardant, a halogen-based flame retardant, etc. may be added to the non-aqueous electrolyte.

The ion conducting medium may contain, for example, an ionic liquid. The ionic liquid may be contained as a supporting electrolyte (carrier). The ionic liquid may contain trifluoromethanesulfonate anions or bis(trifluoromethanesulfonyl)imide anions. Examples of the cations in the ionic liquid include imidazolium cations, alkylpiperidium cations, and alkylpyrrolidinium cations. Examples of the ionic liquid include N,N-diethyl-N-methyl-N-(2-methoxyethyl) ammonium bis(trifluoromethylsulfonyl)imide (DEME-TFSI), N,N-diethyl-N-ethyl-N-(2-methoxyethyl)ammonium bis(trifluoromethylsulfonyl)imide, N-methyl-N-propylpiperidium bis(trifluoromethylsulfonyl)imide, 1-methyl-3-propylimidazolium bis(trifluoromethylsulfonyl)imide, and 1-ethyl-3-butylimidazolium tetrafluoroborate. These may be used alone or as a mixture of two or more.

Instead of the ion conducting medium in liquid form, an ion conducting polymer, for example, may be used. The ion conducting polymer used may be, for example, a polymer gel composed of a supporting electrolyte and a polymer of acrylonitrile, ethylene oxide, propylene oxide, methyl methacrylate, vinyl acetate, vinylpyrrolidone, vinylidene fluoride, etc. A combination of the ion conducting polymer and a non-aqueous electrolyte may also be used. The ion conducting medium used may be, in addition to the ion conducting polymer, an inorganic solid electrolyte, a mixture of an organic polymer electrolyte and an inorganic solid electrolyte, or a powder of an inorganic solid bonded by an organic binder.

The storage device may include a separator between the positive electrode and the negative electrode. No particular limitation is imposed on the separator, so long as it has a composition that can be used in the operating range of the storage device. Examples of the separator include: polymer nonwoven fabrics such as polypropylene-made nonwoven fabrics and polyphenylene sulfide-made nonwoven fabrics; and thin microporous films of olefin-based resins such as polyethylene and polypropylene. These may be used alone or as a mixture of two or more.

The positive electrode of the storage device may contain a positive electrode active material that can occlude and release lithium ions, and the negative electrode may be the storage device electrode containing the above-described carbon porous body as an active material. This positive electrode may be any positive electrode used for general lithium ion batteries. In this case, the positive electrode active material used may be a sulfide containing a transition metal element, an oxide containing lithium and a transition metal element, etc. Specifically, the positive electrode active material used may be: a transition metal sulfide such as $TiS_2$, $TiS_3$, $MoS_3$, or $FeS_2$; a lithium-manganese complex oxide having a basic compositional formula such as $Li_{(1-x)}MnO_2$ ($0<x<1$, the same applies to the following) or $Li_{(1-x)}Mn_2O_4$; a lithium-cobalt complex oxide having a basic compositional formula such as $Li_{(1-x)}CoO_2$; a lithium nickel complex oxide having a basic compositional formula such as $Li_{(1-x)}NiO_2$; a lithium-nickel-cobalt-manganese complex oxide having a basic compositional formula such as $Li_{(1-x)}Ni_aCo_b$-$Mn_cO_2$ (a+b+c=1); a lithium-vanadium complex oxide having a basic compositional formula such as $LiV_2O_3$; or a transition metal oxide having a basic compositional formula such as $V_2O_5$. Of these, lithium-transition metal complex oxides etc. are preferable. The "basic compositional formula" is meant to allow an additional element to be contained. The positive electrode may be formed, for example, by mixing the above-described positive electrode active material, an electrical conducting material, and a binder, adding an appropriate solvent to the mixture to prepare a positive electrode mixture in paste form, applying the positive electrode mixture to the surface of a current collector, drying the positive electrode mixture, and, if necessary, compressing the dried positive electrode mixture in order to increase the density of the electrode. Any of the materials exemplified for the storage device electrode may be appropriately used as the electrical conducting material, the binder, and the current collector. For example, as the positive electrode, any known positive electrode used for lithium ion capacitors etc. may be used. In this case, the positive electrode active material used is preferably activated carbon etc. having a large specific surface area and capable of occluding and releasing ions.

Figure 2:
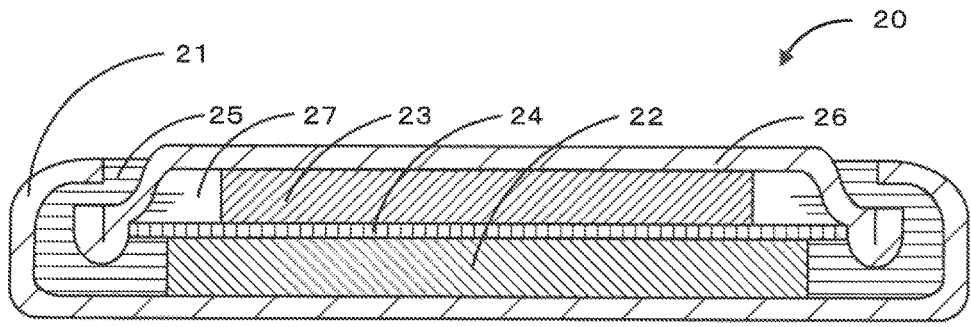
FIG. 2 is a schematic illustration showing an example of a storage device 20.

No particular limitation is imposed on the shape of the storage device. Examples of the shape of the storage device include a coin shape, a button shape, a sheet shape, a layered shape, a cylindrical shape, a flattened shape, and a rectangular shape. The storage device may be used as a large-scale storage device used for electric cars etc. FIG. 2 is a schematic illustration showing an example of a storage device 20. The storage device 20 includes a cup-shaped battery case 21, a positive electrode 22 including a positive electrode active material and disposed in a lower part of the battery case 21, a negative electrode 23 including a negative electrode active material and disposed so as to face the positive electrode 22 through a separator 24, a gasket 25 formed of an insulating material, and a sealing plate 26 that is disposed in an opening of the battery case 21 and hermetically seals the battery case 21 through the gasket 25. In the storage device 20, a space between the positive electrode 22 and the negative electrode 23 is filled with an ion conducting medium 27. At least one of the positive electrode 22 and the negative electrode 23 includes the carbon porous body as an active material.

In the storage device in the present embodiment described above in detail, improved charge-discharge capacity can be obtained in a wider temperature range such as a low-temperature region at −20° C. The reason that the above effect is obtained may be as follows. For example, the carbon porous body used as the active material has a pore structure including micropores and mesopores that is not obtained through ordinary activation treatment, and therefore the surface area usable for adsorption-desorption of charge-carrying ions is increased. In particular, it is conceivable that the presence of large pores is effective in preventing a reduction in capacity at low temperature or under high load. Moreover, a significant improvement in low-temperature performance can be achieved for adsorption and desorption of large solvated lithium ions.

The present disclosure is not limited to the foregoing embodiments. It will be obvious that various modifications may be made within the technical scope of the present disclosure.

For example, in the description of the above embodiments, the carrier is lithium ions and their counter anions, but this is not a limitation. Examples of the cations serving as the carrier include: alkali metal ions such as sodium ions and potassium ions; alkaline-earth metal ions such as magnesium ions and calcium ions; ammonium ions; primary to tertiary amines and quaternary ammonium cations. The anions serving as the carrier may be, for example, ionic liquid anions.

EXAMPLES

Hereinafter, examples in which the carbon porous body of the present disclosure was actually produced will be described as Experimental Examples. Experimental Examples 3, 4, and 7 to 9 correspond to Examples, and Experimental Examples 1, 2, 5, 6, and 10 to 13 correspond to Reference Examples.

Experimental Examples 1 to 4

2,6-Naphthalenedicarboxylic acid dilithium salt (Naph-Li) was heated in nitrogen at a prescribed temperature for 3 hours to obtain a carbon porous body containing carbon and further containing in part a metal component. The carbon porous body was dispersed in water, and an excess amount of hydrochloric acid was added to thereby perform elution treatment in which the metal component remaining in the porous body was eluted. The residue, i.e., carbon, was separated by filtration and dried to thereby obtain the target carbon porous body. Carbon porous bodies produced at firing temperatures of 650° C., 750° C., 850° C., and 950° C. were used as carbon porous bodies in Experimental Examples 1 to 4, respectively.

Experimental Examples 5 to 9

Carbon porous bodies were obtained through the same steps as in Experimental Example 1 except that 4,4'-biphenyldicarboxylic acid dilithium salt (Bph-Li) was used. The carbon porous bodies produced at firing temperatures of 650° C., 750° C., 850° C., 950° C. and 1,000° C. were used as carbon porous bodies in Experimental Examples 5 to 9. In Experimental Example 9, no elution treatment was performed.

Experimental Example 10

A carbon porous body was obtained through the same steps as in Experimental Example 9 except that argon was used as the heating atmosphere during firing. This carbon porous body was used as a carbon porous body in Experimental Example 10.

Experimental Examples 11 and 12

0.1 mol (16.6 g) of terephthalic acid (hereinafter abbreviated as PTA), 0.09 mol (6.7 g) of calcium hydroxide ($Ca(OH)_2$), and 0.02 mol (1.1 g) of potassium hydroxide (KOH) were mixed. 10 g of water was added, and the resulting mixture was kneaded. The mixture was left to stand for 24 hours and then dried at 80° C. to obtain a complex salt. The complex salt obtained was heated at 600° C. in an inert atmosphere for 3 hours to thereby obtain a complex composed of carbon and metal carbonates (part of them were metal oxides). The complex was dispersed in water, and an excess amount of hydrochloric acid was added to elute the metal components. The residue, i.e., carbon, was separated by filtration and dried to thereby obtain a carbon porous body in Experimental Example 11. A carbon porous body was obtained by the same treatment as in Experimental Example 11 except that, when the salt was synthesized, the salt having a composition of 0.1 mol (16.6 g) of PTA, 0.07 mol (5.2 g) of calcium hydroxide, and 0.06 mol (3.4 g) of potassium hydroxide was prepared. The carbon porous body obtained was used as a carbon porous body in Experimental Example 12.

Experimental Example 13

Commercial activated carbon (YP-50 manufactured by Kuraray Chemical Co., Ltd.) was used as a carbon porous body in Experimental Example 13.

Nitrogen Adsorption Isotherm Measurement

For each of the carbon porous bodies in Experimental Examples 1 to 13, nitrogen adsorption measurement at liquid nitrogen temperature (77K) was performed to determine a nitrogen adsorption-desorption isotherm. The characteristics of pores were computed from the nitrogen adsorption-desorption isotherm. The nitrogen adsorption isotherm was obtained by performing the measurement using Autosorb-1 manufactured by Quantachrome Instruments, and the amount of adsorption was analyzed. In the nitrogen adsorption isotherm, the difference in the amount of nitrogen adsorbed between a specific measurement point and the next measurement point was divided by the difference in relative pressure to determine the derivative (gradient) of the nitrogen adsorption isotherm. Then $\alpha$s plot analysis was performed to determine the volume of micropores ($cm^3$ (STP)/g) from the value of the intercept of the extrapolated straight line of the plot. In the $\alpha$s plot analysis, a standard isotherm for comparison was used. The standard isotherm used is described in "Characterization of porous carbons with high resolution alpha(s)-analysis and low temperature magnetic susceptibility" Kaneko, K; Ishii, C; Kanoh, H; Hanazawa, Y; Setoyama, N; Suzuki, T, ADVANCES IN COLLOID AND INTERFACE SCIENCE vol. 76, p 295-320 (1998).

(Results and Discussion)

Figure 3:
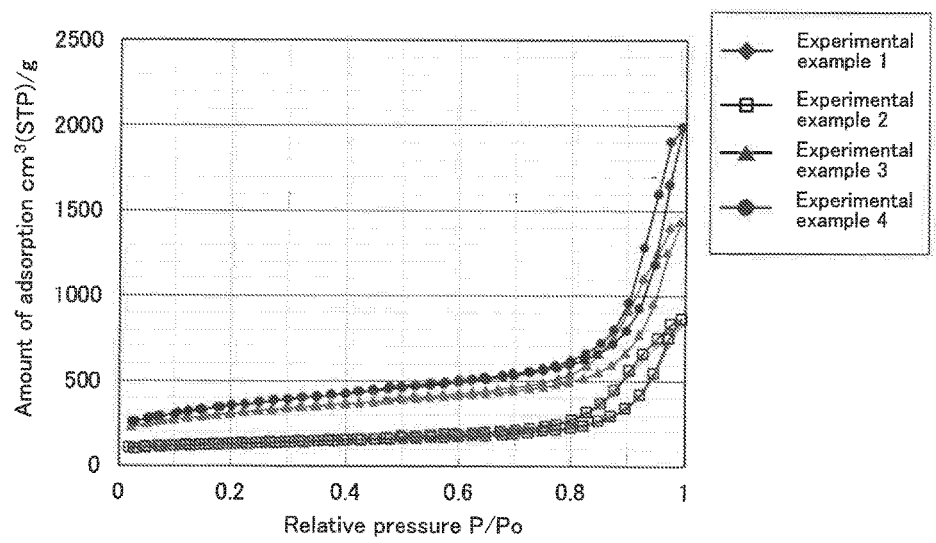
FIG. 3 shows nitrogen adsorption-desorption isotherms in Experimental Examples 1 to 4.
Figure 4:
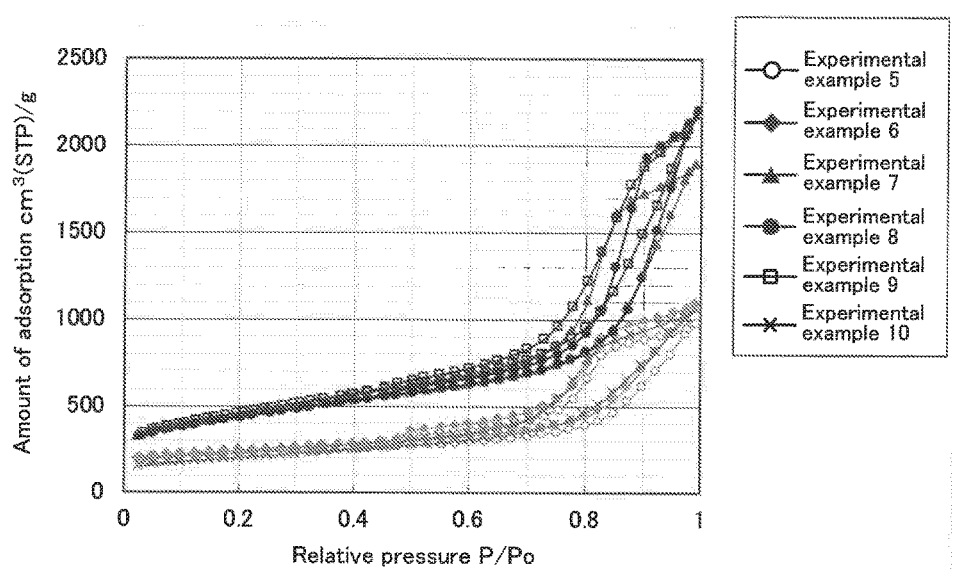
FIG. 4 shows nitrogen adsorption-desorption isotherms in Experimental Examples 5 to 10.
Figure 5:
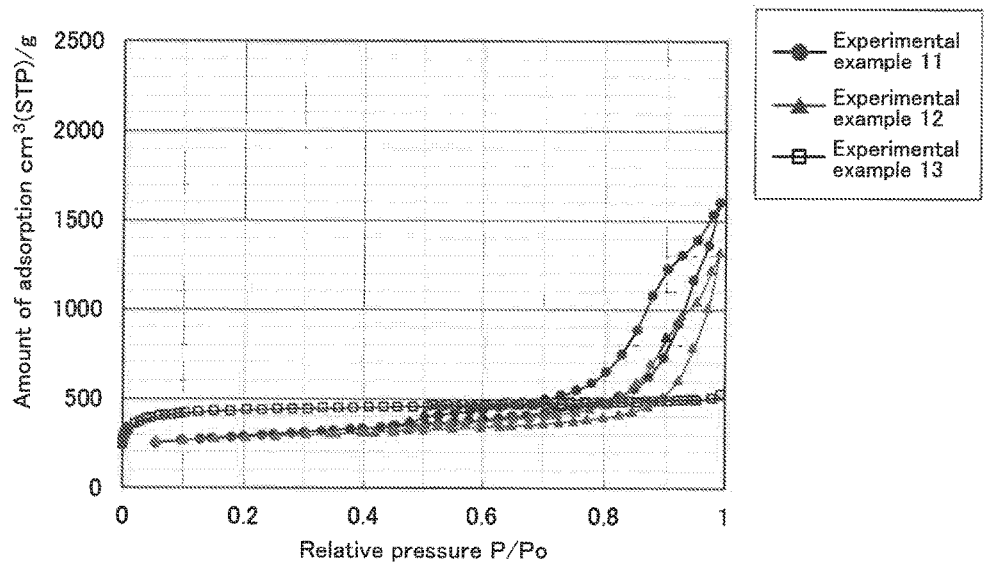
FIG. 5 shows nitrogen adsorption-desorption isotherms in Experimental Examples 11 to 13.
Figure 6:
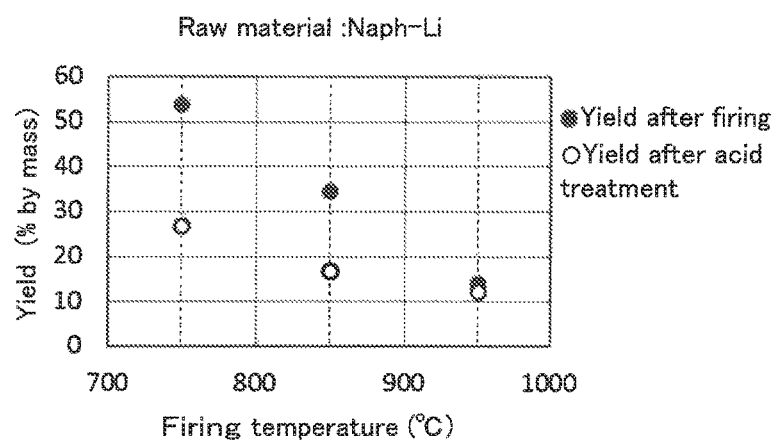
FIG. 6 shows yields after firing and after elution treatment in Experimental Examples 2 to 4.
Figure 7:
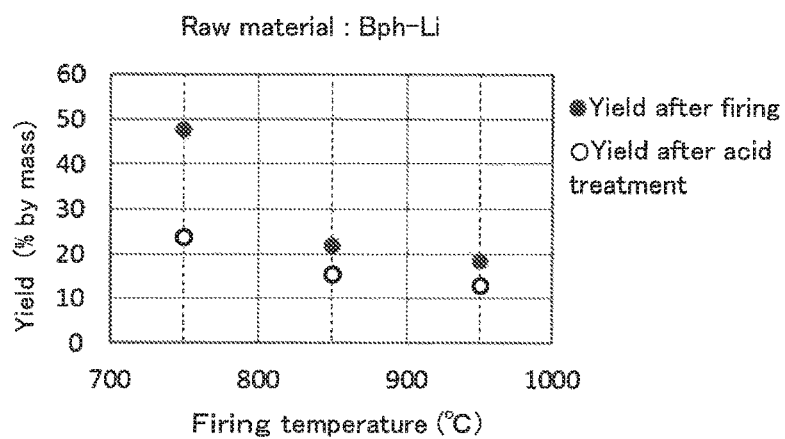
FIG. 7 shows yields after firing and after elution treatment in Experimental Examples 6 to 8.
Figure 8:
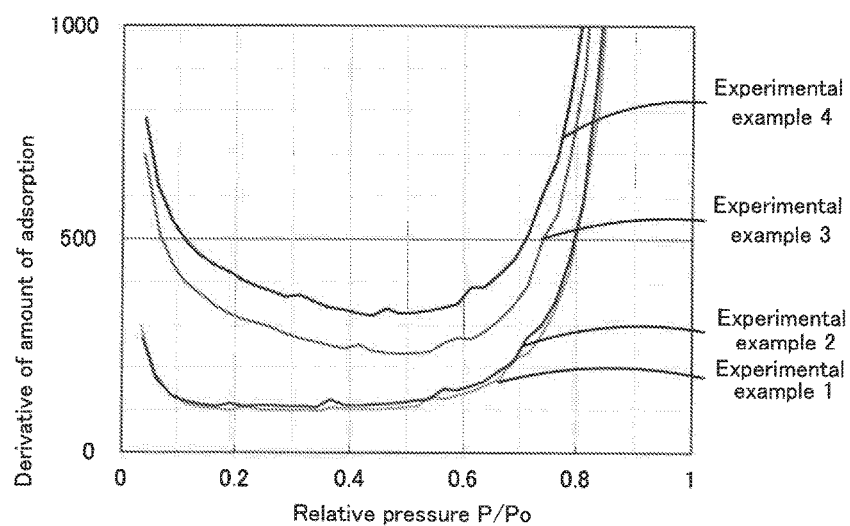
FIG. 8 is a graph showing the relation between the derivative of the amount of adsorption and relative pressure in Experimental Examples 1 to 4.
Figure 9:
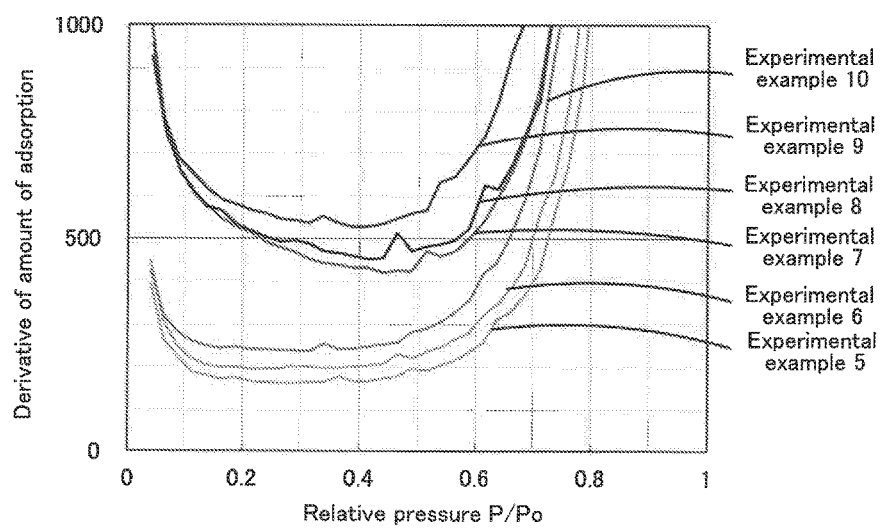
FIG. 9 is a graph showing the relation between the derivative of the amount of adsorption and relative pressure in Experimental Examples 5 to 10.
Figure 10:
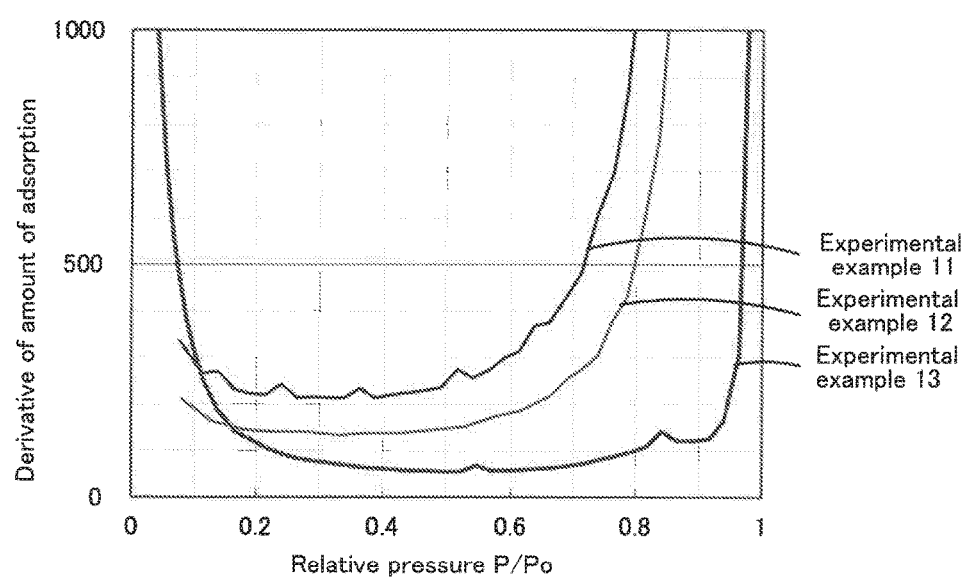
FIG. 10 is a graph showing the relation between the derivative of the amount of adsorption and relative pressure in Experimental Examples 11 to 13.

The results of the measurement are shown in FIGS. 3 to 10 and Table 1. FIG. 3 shows the nitrogen adsorption-desorption isotherms in Experimental Examples 1 to 4. FIG. 4 shows the nitrogen adsorption-desorption isotherms in Experimental Examples 5 to 10. FIG. 5 shows the nitrogen adsorption-desorption isotherms in Experimental Examples 11 to 13. FIG. 6 shows the yields after firing and after the elution treatment in Experimental Examples 2 to 4. FIG. 7 shows the yields after firing and after the elution treatment in Experimental Examples 6 to 8. FIG. 8 is a graph showing the relation between the derivative of the amount of adsorption and relative pressure in Experimental Examples 1 to 4. FIG. 9 is a graph showing the relation between the derivative of the amount of adsorption and relative pressure in Experimental Examples 5 to 10. FIG. 10 is a graph showing the relation between the derivative of the amount of adsorption and relative pressure in Experimental Examples 11 to 13. Table 1 summarizes the raw material, the firing temperature (° C.), the yield (% by mass) after firing, the yield (% by mass) after the acid treatment, the BET specific surface area ($m^2$/g), the micropore volume ($cm^3$ (STP)/g), the derivative (gradient) of the adsorption isotherm, and the amount of nitrogen adsorbed ($cm^3$ (STP)/g) at a relative pressure of 0.98 for each of Experimental Examples 1 to 13. The yield after firing is a value obtained by dividing the mass of the carbon porous body after firing by its mass before firing and multiplying the quotient by 100. The yield after the acid treatment is a value obtained by dividing the mass of the carbon porous body after firing and acid treatment by its mass before firing and multiplying the quotient by 100.

As shown in FIG. 3 and Table 1, in the nitrogen adsorption isotherms of the carbon porous bodies obtained by firing the 2,6-naphthalenedicarboxylic acid dilithium salt, when the firing temperature was 800° C. or higher and more preferably 850° C. or higher, the amount of adsorption increased slightly when the relative pressure $P/P_0$ was 0.1 to 0.8, and the amount of adsorption was large when the relative pressure was 0.8 or more (Experimental Examples 3 and 4). As shown in FIG. 4 and Table 1, also in the nitrogen adsorption isotherms of the carbon porous bodies obtained by firing the 4,4'-biphenyldicarboxylic acid dilithium salt, when the firing temperature was 800° C. or higher and more preferably 850° C. or higher, the amount of adsorption increased slightly when the relative pressure $P/P_0$ was 0.1 to 0.8, and the amount of adsorption was large when the relative pressure was 0.8 or more, although the hysteresis during desorption was slightly larger (Experimental Examples 7 to 9). The yields of the carbon porous bodies were examined. As can be seen from FIGS. 6 and 7, as the firing temperature increases, the mass ratio of the component eluted with acid decreases. As can be seen, when the firing temperature exceeds, for example, 900° C., the metal component (lithium) is removed by firing without the elution treatment with the acid solution. Therefore, it is inferred that, when the firing temperature is, for example, 900° C. or higher, the elution treatment can be omitted. Moreover, it was found that, in Experimental Example 10 in which Ar was used as the firing atmosphere, a structure different from that in Experimental Example 9 was formed.

FIGS. 8 to 10 show the derivative of the amount of adsorption ($cm^3$ (STP)/g) that is obtained by dividing the difference in the amount of adsorption between two point in a nitrogen adsorption isotherm by the difference in relative pressure. The derivative represents the magnitude of the gradient of the adsorption isotherm. In Experimental Examples 3, 4 and 7 to 9, the derivative of the nitrogen adsorption isotherm is 300 ($cm^3$ (STP)/g) or more over the range where the relative pressure $P/P_0$ is from 0.10 to 0.20 inclusive. In Experimental Examples 3, 4, and 7 to 9, the derivative of the nitrogen adsorption isotherm is 200 ($cm^3$ (STP)/g) or more over the range where the relative pressure $P/P_0$ is from 0.20 to 0.95 inclusive. It is inferred that, in these Experimental Examples, unlike Experimental Examples 10 to 13 in which only pores having specific pore diameters are present, pores having various pore diameters ranging from micropores to mesopores are relatively uniformly present. It may be highly probable that, with the carbon porous body production method of the present disclosure, a carbon porous body having a structure including micropores and mesopores that is not obtained through ordinary activation treatment is obtained. As described above, the carbon porous body of the present disclosure has micropores and mesopores uniformly dispersed, and functionality improvements such as an improvement in gas adsorption rate and an improvement in the amount of gas adsorbed are expected.

TABLE 1

| | Raw material[1] | Firing atmosphere | Firing temperature °C. | Yield after firing % by mass | Yield after acid treatment % by mass | BET specific surface area m²/g | Micropore volume[2] | Gradient of amount of adsorption when $P/P_0$ = 0.1-0.2[3] | Gradient of amount of adsorption when $P/P_0$ = 0.2-0.95[3] | Amount of adsorption when $P/P_0$ = 0.98[2] |
|---|---|---|---|---|---|---|---|---|---|---|
| Experimental example 1 | Naph-Li | Nitrogen | 650 | | | 506 | 72 | 100 | 97 | 753 |
| Experimental example 2 | | Nitrogen | 750 | 53.8 | 26.9 | 531 | 70 | 109 | 106 | 788 |
| Experimental example 3 | | Nitrogen | 850 | 34.5 | 16.7 | 1167 | 174 | 326 | 232 | 1327 |
| Experimental example 4 | | Nitrogen | 950 | 14.1 | 12.4 | 1266 | 156 | 421 | 322 | 1765 |
| Experimental example 5 | Bph-Li | Nitrogen | 650 | | | 853 | 125 | 173 | 160 | 945 |
| Experimental example 6 | | Nitrogen | 750 | 47.6 | 24.0 | 949 | 127 | 200 | 194 | 1063 |
| Experimental example 7 | | Nitrogen | 850 | 21.9 | 15.7 | 1544 | 188 | 526 | 419 | 1839 |
| Experimental example 8 | | Nitrogen | 950 | 18.4 | 13.1 | 1531 | 164 | 533 | 451 | 2115 |
| Experimental example 9 | | Nitrogen | 1000 | | | 1609 | 131 | 579 | 527 | 2112 |
| Experimental example 10 | | Ar | 1000 | | | 700 | 50 | 243 | 236 | 1023 |
| Experimental example 11 | PTA-(Ca + K) (1:0.9:0.2) | Nitrogen | 600 | | | 1099 | 153 | 221 | 212 | 1464 |
| Experimental example 12 | PTA-(Ca + K) | Nitrogen | 600 | | | 1127 | 196 | 146 | 134 | 1140 |
| Experimental example 13 | Activated carbon | | | | | 1342 | 407 | 122 | 50 | 506 |

Next, examples in which a storage device using the carbon porous body of the present disclosure as an active material was actually produced will be described as Experimental Examples. Experimental Example 14 corresponds to an Example, and Experimental Examples 15 and 16 correspond to Reference Examples.

Experimental Example 14

4,4'-Biphenyldicarboxylic acid dilithium salt (Bph-Li) was fired in nitrogen at 1,000° C. to obtain a carbon porous body containing carbon and further containing in part the metal component. The carbon porous body was dispersed in water, and an excess amount of hydrochloric acid was added to elute the metal component remaining in the porous body. Then the residue, i.e., carbon, was separated by filtration and dried to thereby obtain a carbon porous body in Experimental Example 14. The obtained carbon porous body serving as an active material, SBR and CMC serving as binders, and carbon black serving as an electrical conducting material were mixed at a mass ratio of 8:1:1 in water used as a solvent to prepare a mixture in slurry form. The mixture was applied to an aluminum current collector foil and dried to obtain a capacitor electrode. The electrode was opposed to a metal lithium counter electrode through a polyethylene porous film (E20MMS manufactured by Toray Battery Separator Film Co., Ltd.) used as a separator, and an electrolyte was added to produce an electrochemical cell. The electrolyte used was prepared by dissolving 1.0 mol/L of $LiPF_6$ in a solvent with a volume ratio of EC:DMC:EMC=3:4:3. The product obtained was used as a storage device in Experimental Example 14. This storage device was used to perform single-electrode evaluation of the electrode including the carbon porous body.

Experimental Example 15

A carbon porous body and an electrochemical cell obtained through the same steps as in Experimental Example 14 except that the firing temperature was changed to 800° C. were used as a carbon porous body and an electrochemical cell in Experimental Example 15.

Experimental Example 16

An electrochemical cell produced through the same steps as in Experimental Example 14 except that commercial activated carbon (YP-50F manufactured by Kuraray Chemical Co., Ltd.) was used was used as an electrochemical cell in Experimental Example 16.

(Nitrogen Adsorption Isotherm Measurement)

Figure 11:
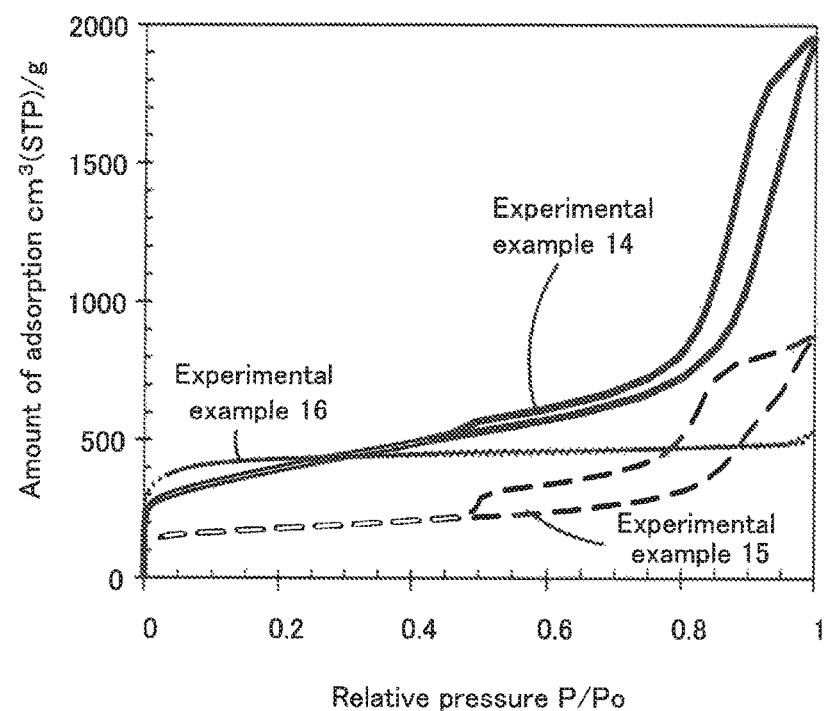
FIG. 11 shows nitrogen adsorption-desorption isotherms in Experimental Examples 14 to 16.
Figure 12:
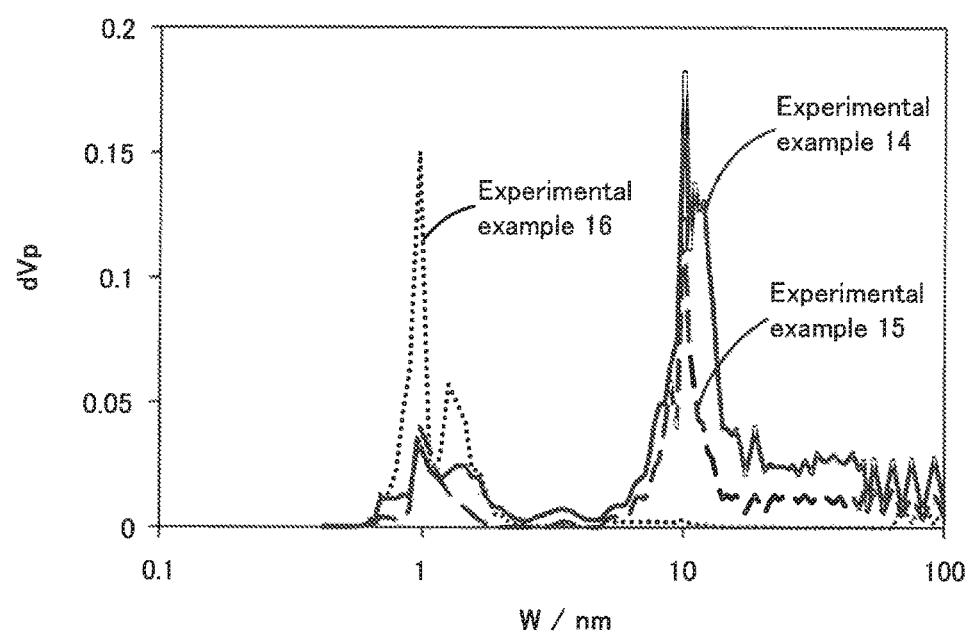
FIG. 12 shows pore distribution curves analyzed by a GCMC method in Experimental Examples 14 to 16.

For each of the carbon porous bodies in Experimental Examples 14 to 16, nitrogen adsorption measurement was performed at liquid nitrogen temperature (77K) in the same manner as in the above-described Experimental Examples to determine a nitrogen adsorption-desorption isotherm. FIG. 11 shows the nitrogen adsorption-desorption isotherms in Experimental Examples 14 to 16. FIG. 12 shows pore distribution curves in Experimental Examples 14 to 16 that were obtained by analyzing the nitrogen adsorption-desorption isotherms by a GCMC method. The results of measurement for Experimental Examples 14 to 16 are shown in Table 2. In Experimental Example 14, as in Experimental Example 9 above, a preferable pore distribution and a preferable specific surface area were obtained.

TABLE 2

|  | Raw material[1] | Firing temperature °C. | BET specific surface area m²/g | Micropore volume[2] | Gradient of amount of adsorption when $P/P_0$ = 0.1-0.2[3] | Gradient of amount of adsorption when $P/P_0$ = 0.2-0.95[3] | Amount of adsorption when $P/P_0$ = 0.98[2] |
|---|---|---|---|---|---|---|---|
| Experimental example 14 | Bph-Li | 1000 | 1393 | 161 | 495 | 425 | 1800 |
| Experimental example 15 |  | 800 | 646 | 78 | 135 | 135 | 800 |
| Experimental example 16 | Activated carbon |  | 1649 | 405 | 80 | 45 | 490 |

[1]Bph: biphenyldicarboxylic acid
[2]The unit of pore volume and the unit of the amount of adsorption are cm³ (STP)/g.
[3]The minimum value of the derivative of the amount of adsorption in the specified range in an adsorption isotherm (the adsorption side).

(Charge-Discharge Evaluation)

For each of Experimental Examples 14 to 16, charge-discharge evaluation was performed. Each cell was subjected to charge-discharge cycles with a constant current of 1C at temperatures of 20° C., 0° C., −20° C. such that electric potential was changed back and forth between prescribed values. A cycle in which potential with respect to lithium (Li/Li+, the same applied to the following) was changed between 3.0 V and 4.2 V was repeated 5 times, and a cycle in which the potential with respect to lithium was changed between 3.0 V to 1.8 V was repeated 5 times. Then a cycle in which the potential with respect to lithium was changed between 1.8 V to 4.2 V was repeated 5 times. The spontaneous potential of each of the electrodes evaluated was about 3 V. Therefore, it is conceivable that, during charge-discharge in the potential range of 3.0 V to 4.2 V, adsorption/desorption of anions ($PF_6^-$ ions) on/from the active material occurs. Similarly, it is conceivable that, during charge-discharge in the potential range of 3.0 V to 1.8 V, adsorption/desorption of cations (solvated $Li^+$ ions) on/from the active material occurs. The potential difference and the difference in the amount of electric charge between the start and end of discharge in each of the charging-discharging curves obtained were used to determine and evaluate differential capacitance (F/g). In Experimental Example 14, the number n of samples measured was 3. In Experimental Examples 15 and 16, the number n of samples measured was 2. The average values and standard deviations were determined.

(Results and Discussion)

Figure 13:
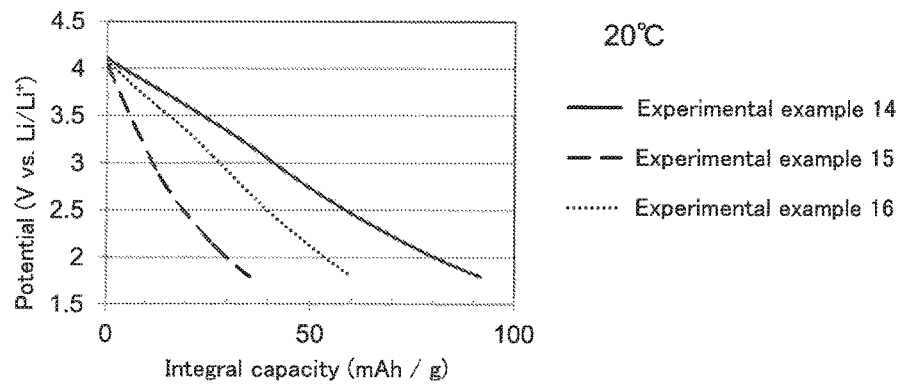
FIG. 13 shows discharge curves at 20° C. in Experimental Examples 14 to 16.
Figure 14:
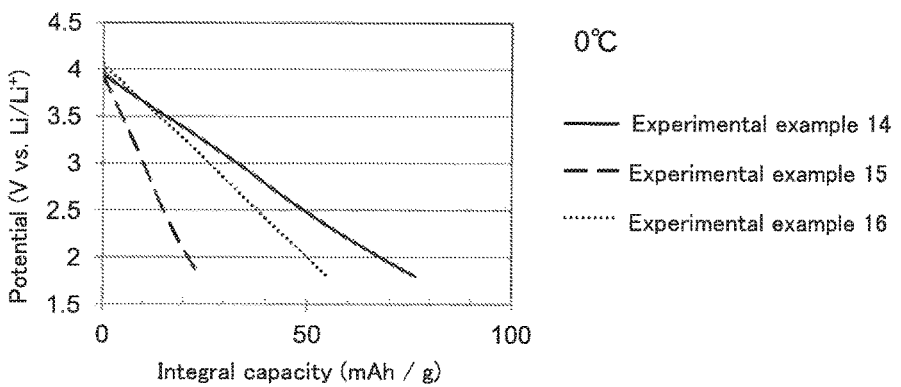
FIG. 14 shows discharge curves at 0° C. in Experimental Examples 14 to 16.
Figure 15:
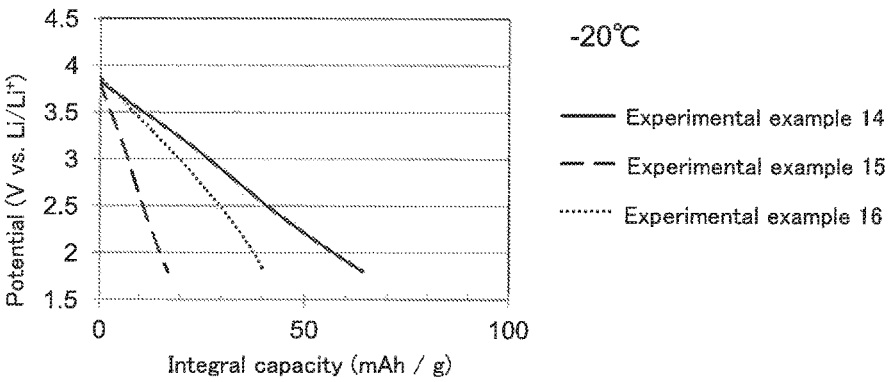
FIG. 15 shows discharge curves at −20° C. in Experimental Examples 14 to 16.
Figure 16:
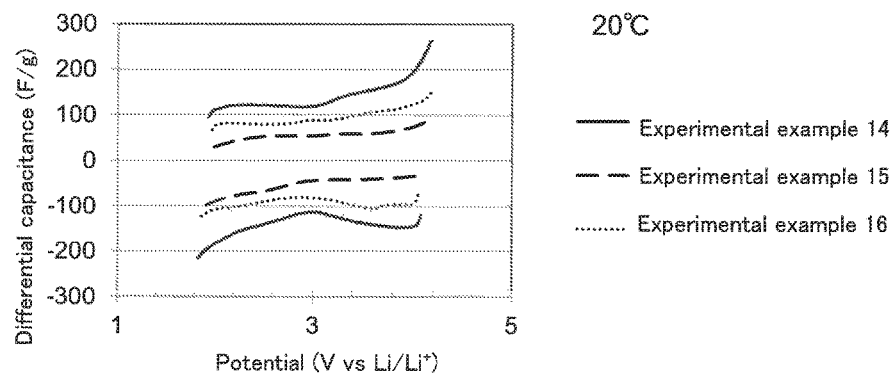
FIG. 16 is a graph showing the relation between differential capacitance and potential at 20° C. in Experimental Examples 14 to 16.
Figure 17:
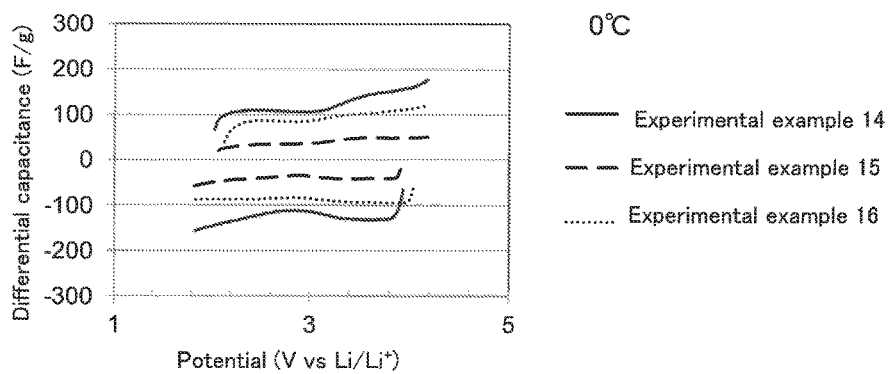
FIG. 17 is a graph showing the relation between differential capacitance and potential at 0° C. in Experimental Examples 14 to 16.
Figure 18:
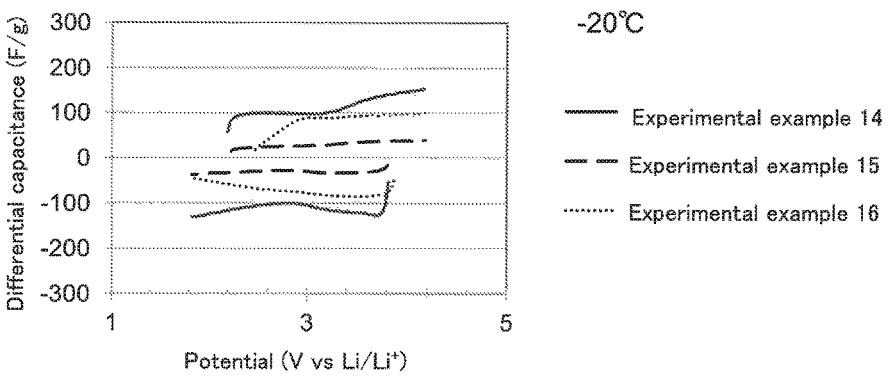
FIG. 18 is a graph showing the relation between differential capacitance and potential at −20° C. in Experimental Examples 14 to 16.
Figure 19:
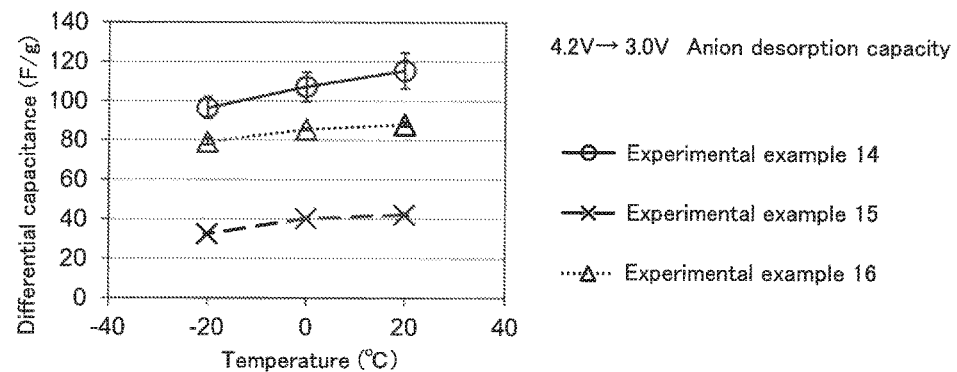
FIG. 19 is a graph showing the relation between differential capacitance and temperature at 4.2 V-3.0 V for each cell.
Figure 20:
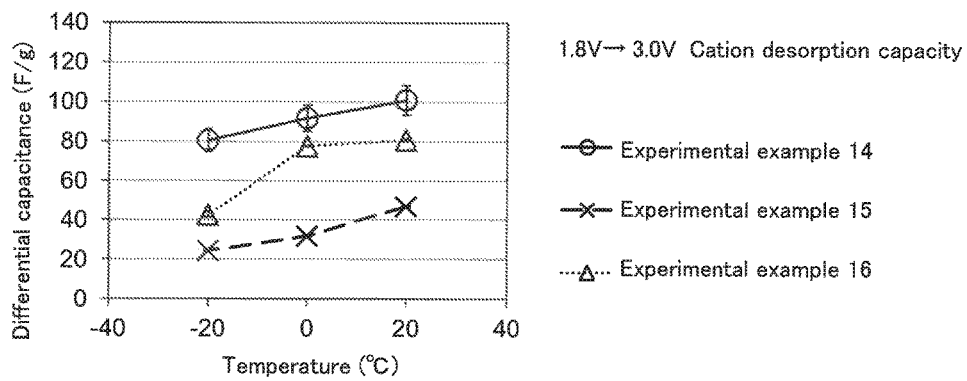
FIG. 20 is a graph showing the relation between differential capacitance and temperature at 1.8 V-3.0 V for each cell.
Figure 21:
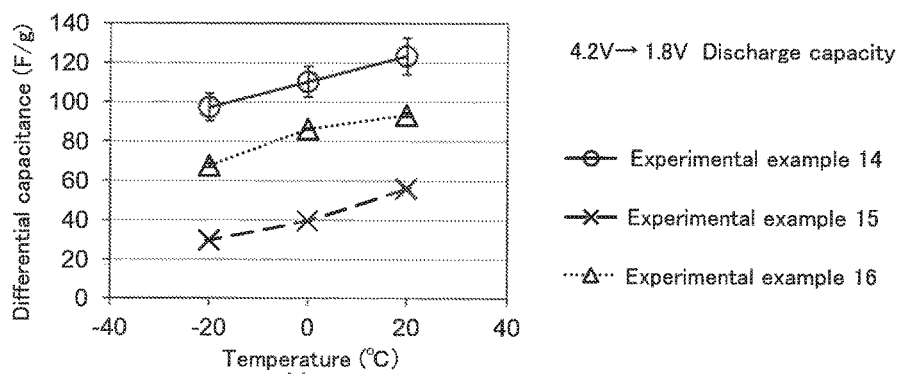
FIG. 21 is a graph showing the relation between differential capacitance and temperature at 4.2 V-1.8 V for each cell.

Table 3 summarizes the average differential capacitance (F/g) at the fifth cycle and the standard error for each of the potential ranges of 4.2 V-3.0 V, 1.8 V-3.0 V, and 4.2 V-1.8 V at different measurement temperatures. FIGS. 13 to 15 show discharge curves during discharge from 4.2 V to 1.8 V at the fifth cycle in the potential range of 1.8 V-4.2 V at 20° C., 0° C., and −20° C., respectively. As can be seen from FIGS. 13 to 15, the capacity is higher in Experimental Example 14 than in the other Experimental Examples at all the temperatures. FIGS. 16 to 18 are graphs showing the relation between differential capacitance and potential during the fifth charge-discharge cycle in the potential range of 1.8 V-4.2 V at 20° C., 0° C., and −20° C., respectively. The sign of the differential capacitance is positive in the direction of increasing potential. As can be seen, the absolute value of the differential capacitance is larger in Experimental Example 14 than the other Experimental Examples in almost the entire potential range at all the temperatures. FIGS. 19 to 21 are graphs showing the relation between the differential capacitance and temperature during the fifth charge-discharge cycle in the potential ranges of 4.2 V-3.0 V, 1.8 V-3.0 V, and 4.2 V-1.8 V, respectively. The capacity is higher in Experimental Example 14 than in the other Experimental Examples at all the temperatures. In particular, as for the cation desorption capacity in the potential range of 1.8 V-3.0 V at −20° C., a reduction in capacity in Experimental Example 16 (commercial activated carbon) with no mesopores is large. However, in Experimental Example 14, the reduction in capacity is significantly small. This may be due to the significant difference in the pore structure of the active material.

TABLE 3

|  |  | Measurement potential: 4.2 V→3.0 V Differential capacitance (F/g) | | | Measurement potential: 1.8 V→3.0 V Differential capacitance (F/g) | | | Measurement potential: 4.2 V→1.8 V Differential capacitance (F/g) | | |
|---|---|---|---|---|---|---|---|---|---|---|
|  |  | Measurement temperature | | | | | | | | |
|  |  | 20° C. | 0° C. | −20° C. | 20° C. | 0° C. | −20° C. | 20° C. | 0° C. | −20° C. |
| Experimental example 14 | Average | 115.52 | 107.32 | 96.46 | 100.89 | 91.82 | 80.57 | 123.44 | 110.37 | 97.34 |
|  | Standard error | 9.05 | 7.49 | 5.54 | 7.38 | 6.58 | 5.71 | 9.35 | 7.79 | 6.96 |
| Experimental example 15 | Average | 42.28 | 40.36 | 32.42 | 46.96 | 31.93 | 24.33 | 56.02 | 39.78 | 30.04 |
|  | Standard error | 0.66 | 0.55 | 0.01 | 0.57 | 0.21 | 0.11 | 0.48 | 0.40 | 0.01 |
| Experimental example 16 | Average | 87.81 | 85.40 | 79.10 | 80.87 | 77.74 | 42.57 | 93.70 | 86.55 | 67.95 |
|  | Standard error | 1.00 | 0.65 | 1.67 | 0.60 | 0.09 | 1.26 | 0.82 | 0.43 | 1.02 |

The present disclosure is not limited to the foregoing examples. It will be obvious that various modifications may be made within the technical scope of the present disclosure.

The present application claims priority on the basis of the Japanese Patent Application No. 2016-038986 filed on Mar. 1, 2016, and the Japanese Patent Application No. 2017-025595 filed on Feb. 15, 2017, the entire contents of which are incorporated herein by reference.

What is claimed is:

1. A carbon porous body including micropores and mesopores,
wherein a micropore volume determined at a temperature of 77K by as plot analysis of a nitrogen adsorption isotherm is 100 (cm$^3$ (STP)/g) or more,
a BET specific surface area determined from the nitrogen adsorption isotherm is 1,000 m$^2$/g or more,
a derivative of the nitrogen adsorption isotherm is 300 (cm$^3$ (STP)/g) or more over a range where relative pressure $P/P_0$ in the nitrogen adsorption isotherm is from 0.10 to 0.20 inclusive, and the derivative of the nitrogen adsorption isotherm is 300 (cm$^3$ (STP)/g) or more over a range where the relative pressure $P/P_0$ in the nitrogen adsorption isotherm is from 0.20 to 0.95 inclusive, and
the amount of nitrogen adsorbed when the relative pressure $P/P_0$ in the nitrogen adsorption isotherm is 0.98 is 1,200 (cm$^3$ (STP)/g) or more.

2. The carbon porous body according to claim 1, wherein the derivative of the nitrogen adsorption isotherm is 400 (cm$^3$ (STP)/g) or more over the range where the relative pressure $P/P_0$ in the nitrogen adsorption isotherm is from 0.10 to 0.20 inclusive.

3. The carbon porous body according to claim 1, wherein the amount of nitrogen adsorbed when the relative pressure $P/P_0$ in the nitrogen adsorption isotherm is 0.98 is 1,400 (cm$^3$ (STP)/g) or more.

4. The carbon porous body according to claim 1, wherein the micropore volume is 120 (cm$^3$ (STP)/g) or more.

5. The carbon porous body according to claim 1, wherein the BET specific surface area determined from the nitrogen adsorption isotherm is 1,200 m$^2$/g or more.

6. A storage device electrode comprising the carbon porous body according to claim 1 as an active material.

7. A storage device comprising the storage device electrode according to claim 6.

8. A carbon porous body including micropores and mesopores,
wherein a micropore volume determined at a temperature of 77K by as plot analysis of a nitrogen adsorption isotherm is 100 (cm$^3$ (STP)/g) or more,
a BET specific surface area determined from the nitrogen adsorption isotherm is 1,000 m$^2$/g or more,
a derivative of the nitrogen adsorption isotherm is 400 (cm$^3$ (STP)/g) or more over a range where relative pressure $P/P_0$ in the nitrogen adsorption isotherm is from 0.10 to 0.20 inclusive, and the derivative of the nitrogen adsorption isotherm is 200 (cm$^3$ (STP)/g) or more over a range where the relative pressure $P/P_0$ in the nitrogen adsorption isotherm is from 0.20 to 0.95 inclusive, and
the amount of nitrogen adsorbed when the relative pressure $P/P_0$ in the nitrogen adsorption isotherm is 0.98 is 1,200 (cm$^3$ (STP)/g) or more.

* * * * *